March 18, 1952 F. E. ASBELL 2,589,594
CONCRETE BLOCK MOLDING MACHINE
Filed April 1, 1948
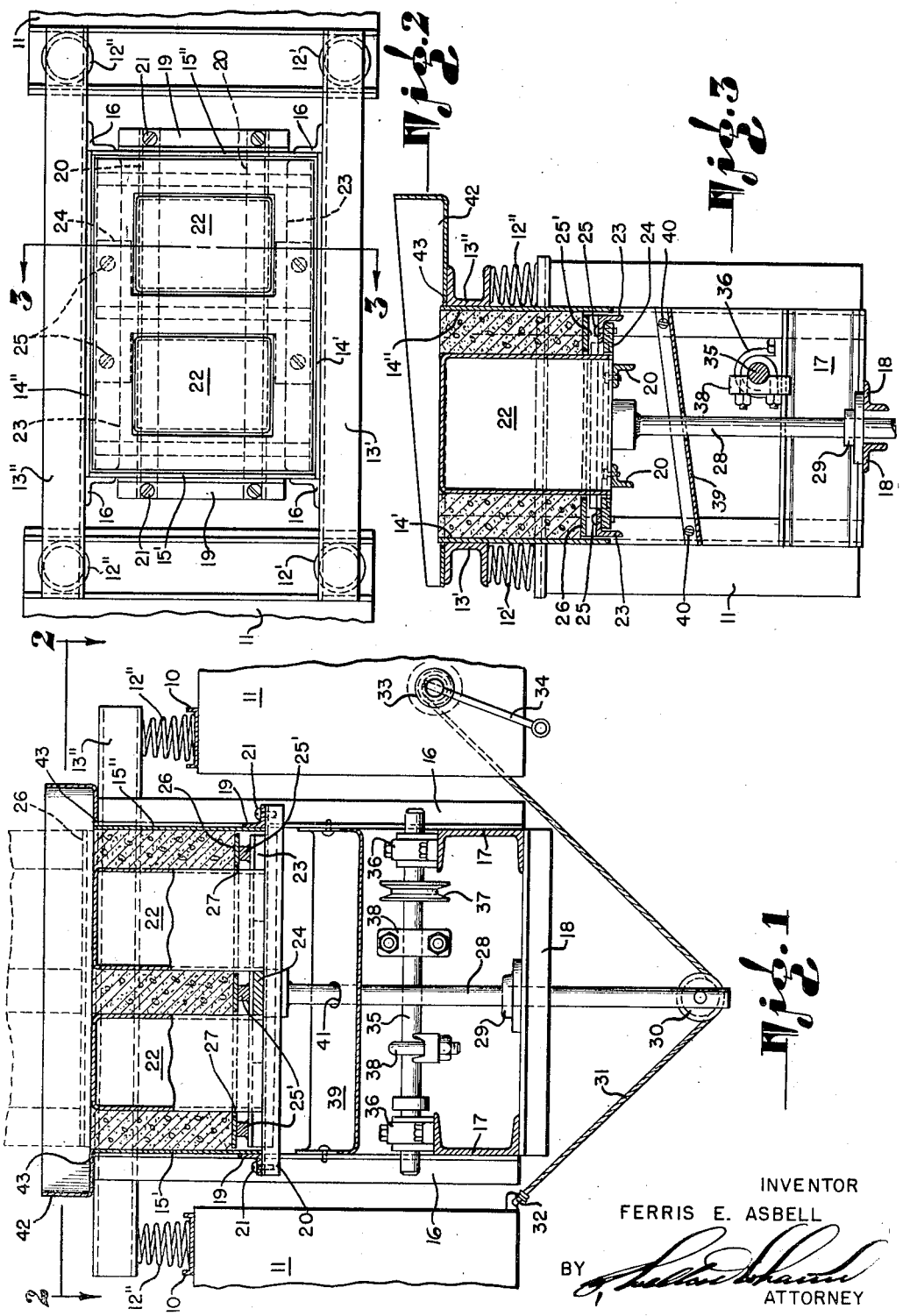
INVENTOR
FERRIS E. ASBELL
BY
ATTORNEY

Patented Mar. 18, 1952

2,589,594

UNITED STATES PATENT OFFICE 2,589,594

CONCRETE BLOCK MOLDING MACHINE

Ferriss E. Asbell, Arlington, Calif.

Application April 1, 1948, Serial No. 18,312

1 Claim. (Cl. 25—41)

The present invention relates generally to apparatus for the casting or molding of a moldable material, and is more particularly concerned with an improved machine for the making of blocks from cement and similar materials.

It is an object of the present invention to provide improved apparatus of the character described which is of simple and efficient construction containing parts so arranged that cement blocks may be cast or molded in a mold having fixed core parts around which the moldable material is deposited upon a removable pallet. At the conclusion of the molding operation, the bottom of the mold is so arranged that it may be elevated to carry the molded block and pallet to the top of the mold, this action separating the block with relation to the core parts and positioning it where it may be readily grasped by the operator and carried on the pallet away from the machine to a curing station.

A further object of the invention is to provide a machine of this character which is fabricated as a compact unit which may be resiliently supported on spring members, and which contains a novel mechanism for imparting vibratory movement to the machine for compacting and conforming the moldable material during the molding operation.

Still another object is to provide a block mold having a pan arrangement at its top and self-contained vibratory means, the pan permitting cut-off of surplus material by means of a straight edge member being passed over the top of the mold after the material has been compacted by vibration.

Further objects of the invention will be brought out in the following part of the specification wherein detailed description is for the purpose of fully disclosing preferred embodiments of the invention, without placing limitations on the scope of the invention defined in the appended claim.

Referring to the drawings, which are for illustrative purposes only:

Fig. 1 is a front elevational section of a cement block machine embodying the features of the herein described invention;

Fig. 2 is a plan view of the machine as viewed from line 2—2 of Fig. 1, the pan being removed; and Fig. 3 is a sectional view, taken substantially on line 3—3 of Fig. 2.

Referring to Fig. 1 of the drawings, the machine of the present invention is suspended from an elevating frame structure of suitable construction. For such purpose, channel members 10—10 are respectively supported on spaced apart elevating pedestal structures 11—11, these channel members being in parallel relation and extending along the respective ends of the machine. Each channel member 10 forms a plate or pad structure and has secured thereto in upstanding relation a pair of spaced coiled springs 12' and 12". The springs 12' at each end of the machine cooperate to resiliently support a front channel rail 13', and the springs 12" cooperate to support a rear channel rail 13".

A box-like mold is positioned between the channel rails 13' and 13", this mold being composed of a forward wall 14', a rear wall 14", and end walls 15' and 15" having their uppermost edges lying in a plane which is slightly spaced above the plane of the upper surfaces of the channels 13' and 13". The mold is secured at its corners to the channel rails 13' and 13" by means of angle frame members 16 which may be fastened by welding or other suitable means and which depend below the mold to form a downwardly projecting frame work. The angle frame members 16 at each end of the mold are connected at their lowermost ends to a transversely extending channel member 17 in each case, the channels 17 being interconnected adjacent their central portions by spaced apart angle members 18—18 as shown in Fig. 3.

Referring again to Figs. 1 and 2, the end walls 15' and 15" are reenforced along their lowermost edges by angle members 19—19, these angle members being interconnected by spaced apart longitudinally extending angle members 20—20 secured at their ends by bolts or screws 21 to the angle members 19. The angle members 20—20 provide a support for spaced upwardly projecting core members 22—22 of hollow construction closed at their uppermost ends and of substantially rectangular transverse configuration. These core members are secured at their lowermost open ends to the angle members 20—20 so that they are in fixed relation to the walls of the mold.

The bottom of the mold is closed by a movably supported structure which may be raised and lowered for the purposes to be hereinafter explained. The bottom structure comprises a pair of longitudinally extending side rails 23—23 of angle iron which extend along the inner front and inner rear of the mold and which are interconnected intermediate their ends by an I-shaped plate member 24 which is connected at its respective ends to the side rails 23—23 as by screws 25. The uppermost flanges of the side rails 23—23 are further interconnected by transversely extending bars 25', one of these bars extending between the core parts 22—22 and another bar being extended between each end of the mold and the adjacently disposed core part so as to form a supporting rack upon which a pallet frame 26 may be supported. This pallet is apertured with openings 27—27 so as to permit passage over the core parts 22—22.

Downward movement of the bottom structure is limited by contact of plate 24 against the upper flanges of angle members 20—20. Provision is made for raising and lowering the bottom structure. This is accomplished by providing a rod 28 which is connected at its uppermost end to the central portion of the plate member 24 so as to vertically depend therefrom. This rod is supported for axial vertical movement in a suitable bearing 29 supported on the spaced angle members 18—18, as shown in Fig. 3.

The lowermost end of the rod 28 has mounted therein a rotatable pulley 30 over which a flexible cable 31 is trained. One end of this cable is anchored as indicated at 32; whereas, the other end of the cable is trained over and windable upon a winding drum 33 having a crank handle 34 by means of which the winding drum may be actuated to manually wind and unwind the cable thereon. It will be apparent that as the cable is wound onto the drum, the portion passing over the pulley 30 will be tightened, with the result that the rod 28 will be moved upwardly and raise the bottom structure within the mold. Unwinding of the cable will act to lower the bottom structure.

As shown in Figs. 1 and 3, a shaft 35, which is disposed at right angles to the rod 28 and offset to one side thereof, is rotatably mounted in spaced bearings 36—36 secured to and supported upon the uppermost flanges of the previously mentioned channel members 17—17. This shaft has fixedly mounted thereon for rotation therewith a driving pulley 37 which may be connected as by a flexible belt to a suitable power source such as an electric motor (not shown). This shaft has secured to it a pair of cable clamps 38—38 which are shown as being similarly spaced from the center of the shaft 35, but which have their corresponding axes disposed in 90° relation as shown in Fig. 3. The purpose of these clamps is to provide weights having their center of gravity off-set with respect to the shaft so as to provide weight members which are eccentrically disposed and which will produce vibratory motion of the connected frame structure when the shaft 35 is rotated. It will be appreciated that other weight arrangements may be utilized, if desired, the cable clamps, however, providing a simple means for obtaining the desired results, and also permitting easy adjustment of the weights to secure varied types of vibrations.

In order to protect the shaft 35 and the bearings in which it is mounted from moldable material which may pass through the bottom structure of the mold, a protective pan or shield 39 is mounted between the shaft and the mold. This shield, as shown in Fig. 3, is inclined downwardly from the rear to forward side of the machine and may be secured at its side margins by screws 40 to the adjacent flanges of corner angle frame members 16. The shield has an opening 41 therein for passage of the rod 28.

At the uppermost end of the mold, there is further provided a shallow pan 42 which is provided with a bottom of greater area than the mold. This bottom is provided with an opening 43 of such size and configuration as to permit the slightly projecting upper end edge margin of the mold walls to pass thereinto, when the pan is supported on the front and rear channel rails 13'—13". The pan is open along one edge and is constructed so as to have slightly greater depth along its rear portion than along its forward open edge.

The structural details of the invention having been explained, the operation will now be briefly described. At the beginning of a molding operation, the bottom structure is in lowered position, as shown in Fig. 1, with a pallet 26 disposed on the top of the bars 25', this pallet in effect forming the bottom mold member. A quantity of moldable material such as a mixture of cement and stone is poured into the mold, or into the pan 42, the amount being slightly more than actually required for the completed block.

Having thus filled the mold with the surplus extending into the pan portion, the power source for driving the pulley 37 is energized, whereupon rotation of the shaft 35 will set up a vibratory movement of the machine, since the unit is supported on the coiled springs 12' and 12". This vibratory or shaking movement will act to compact and shake the moldable material into the mold where it will be conformed around the core members. After the shaking or vibratory operation, a straight edge is raked across the upper edge of the mold from front to back so as to carry the surplus material into the rear portion of the pan 42 where it may be deposited until the molding of the next block when it may be combined with the material used at that time.

The rotation of shaft 35 is now interrupted by shutting down the power means or by utilization of a suitable clutch. Hand operation of the crank 34 by turning it in a clockwise direction will actuate the winding drum so as to wind the flexible cable 31 thereon. This action will cause the rod 28 to move upwardly and raise the completed block to a position in the pan 42, as shown in dotted lines in Fig. 1. In such position, the operator may grasp the pallet and carry it with the block thereon to a location where the block is to be cured and permitted to harden.

By winding the handle 34 in a counterclockwise direction, the bottom structure may again be lowered into the mold, and as soon as another pallet is inserted the same procedure may be followed in molding the next block.

The pallet frame 26, as previously described, will be of appropriate size, depending upon the size of block to be molded and should be so proportioned that it will move up and down within the mold around the cores. It is not desired to limit the construction of this pallet as to the type of material used, and it is contemplated that the pallet may be constructed of cast metal, welded steel, or wood of single piece or plywood construction, and that when wood is utilized, the component parts of the pallet may be nailed, glued or otherwise suitably secured together.

I claim as my invention:

Block molding apparatus, comprising: a pair of side rails; a pan supported on the top of said rails having an opening in its bottom; a frame structure dependingly supported from said side rails; a block mold carried by the frame structure and positioned below said pan to receive moldable material through the pan opening; block ejector means carried by said frame structure for ejecting the block from the mold through said opening, and including an operating rod supported for guided vertical reciprocable movements; flexible means for actuating said rod; an eccentric weight supported on said frame for rotation to impart a vibratory motion to the entire assembled frame structure, side rails, and associated parts of the apparatus as a unit; and springs at the ends of said rails resiliently supporting the unitary assembly for universal movement.

FERRISS E. ASBELL.

REFERENCES CITED

The following references are of record in the file of this patent:

UNITED STATES PATENTS

| Number | Name | Date |
|---|---|---|
| 1,531,479 | Erickson | Mar. 31, 1925 |
| 1,649,731 | Ransohoff | Nov. 15, 1927 |
| 1,770,219 | Shakespeare | July 8, 1930 |
| 2,270,829 | Wellnitz | Jan. 20, 1942 |
| 2,303,884 | Krehbiel et al. | Dec. 1, 1942 |
| 2,308,132 | Wellnitz | Jan. 12, 1943 |
| 2,407,168 | Lindkvist | Sept. 3, 1946 |

FOREIGN PATENTS

| Number | Country | Date |
|---|---|---|
| 172,664 | Great Britain | Dec. 22, 1921 |